Figure 1:
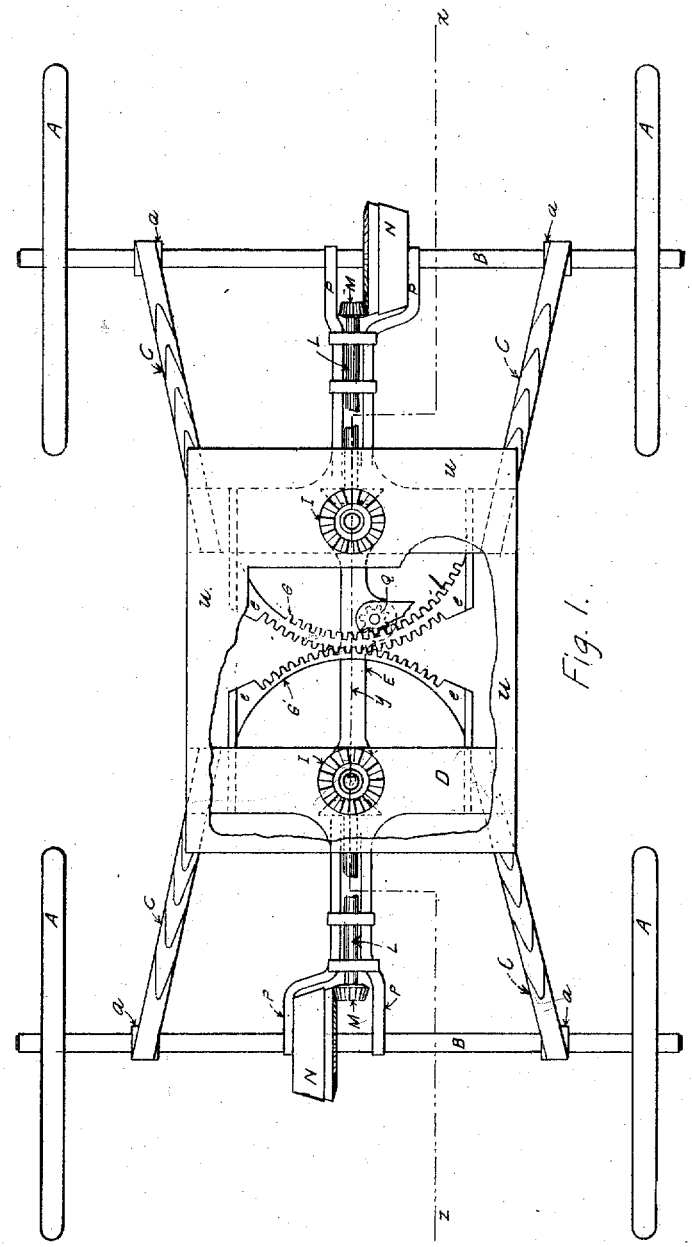

No. 688,016. Patented Dec. 3, 1901.
O. A. GOODRICH.
TRACTION VEHICLE.
(Application filed May 28, 1901.)
(No Model.) 3 Sheets—Sheet 1.

Witnesses
Weston Small
J. M. Lewis

O. A. Goodrich Inventor
By his Attorney
H. C. Gardiner.

No. 688,016. Patented Dec. 3, 1901.
O. A. GOODRICH.
TRACTION VEHICLE.
(Application filed May 28, 1901.)
(No Model.) 3 Sheets—Sheet 2.
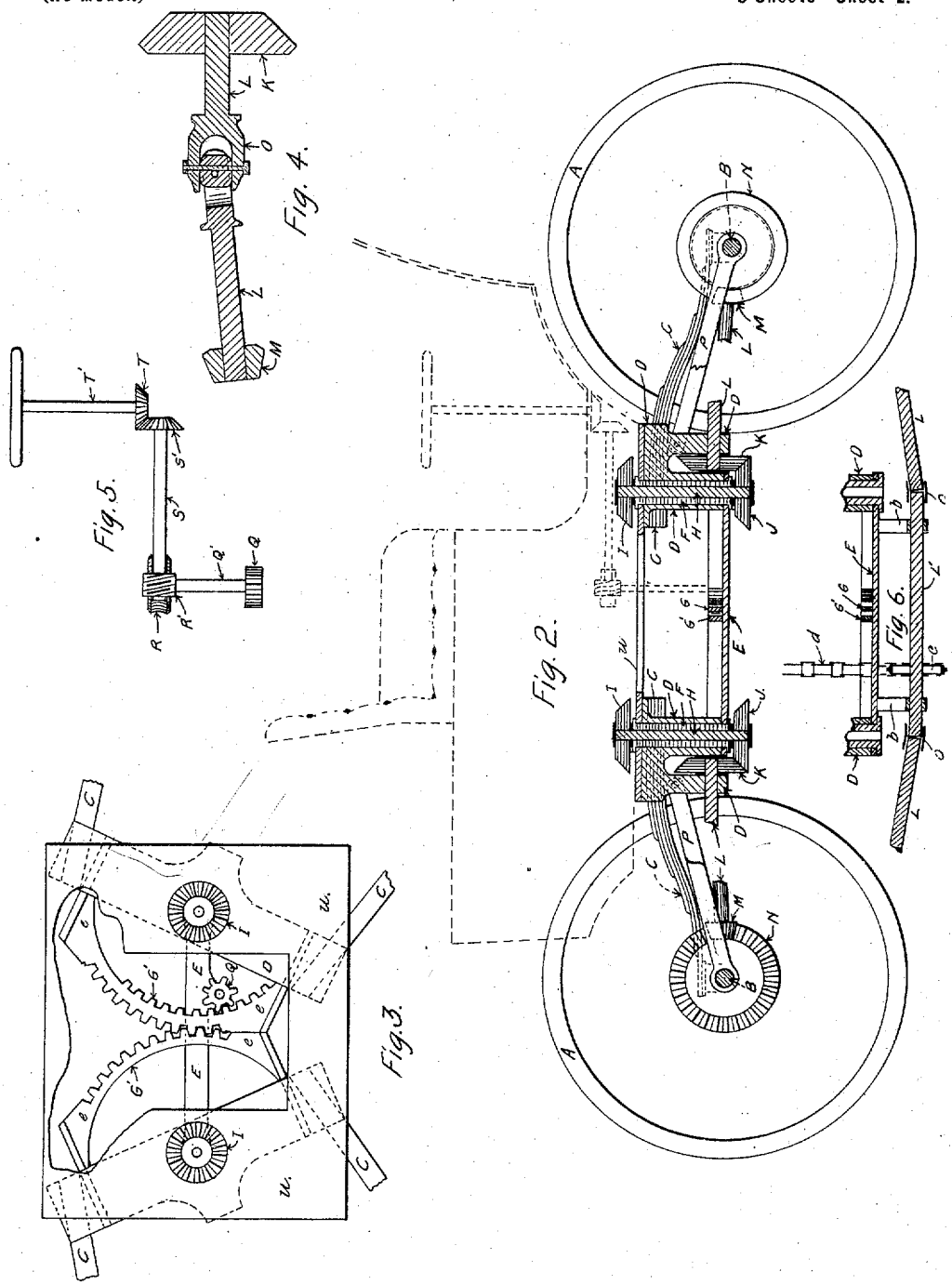

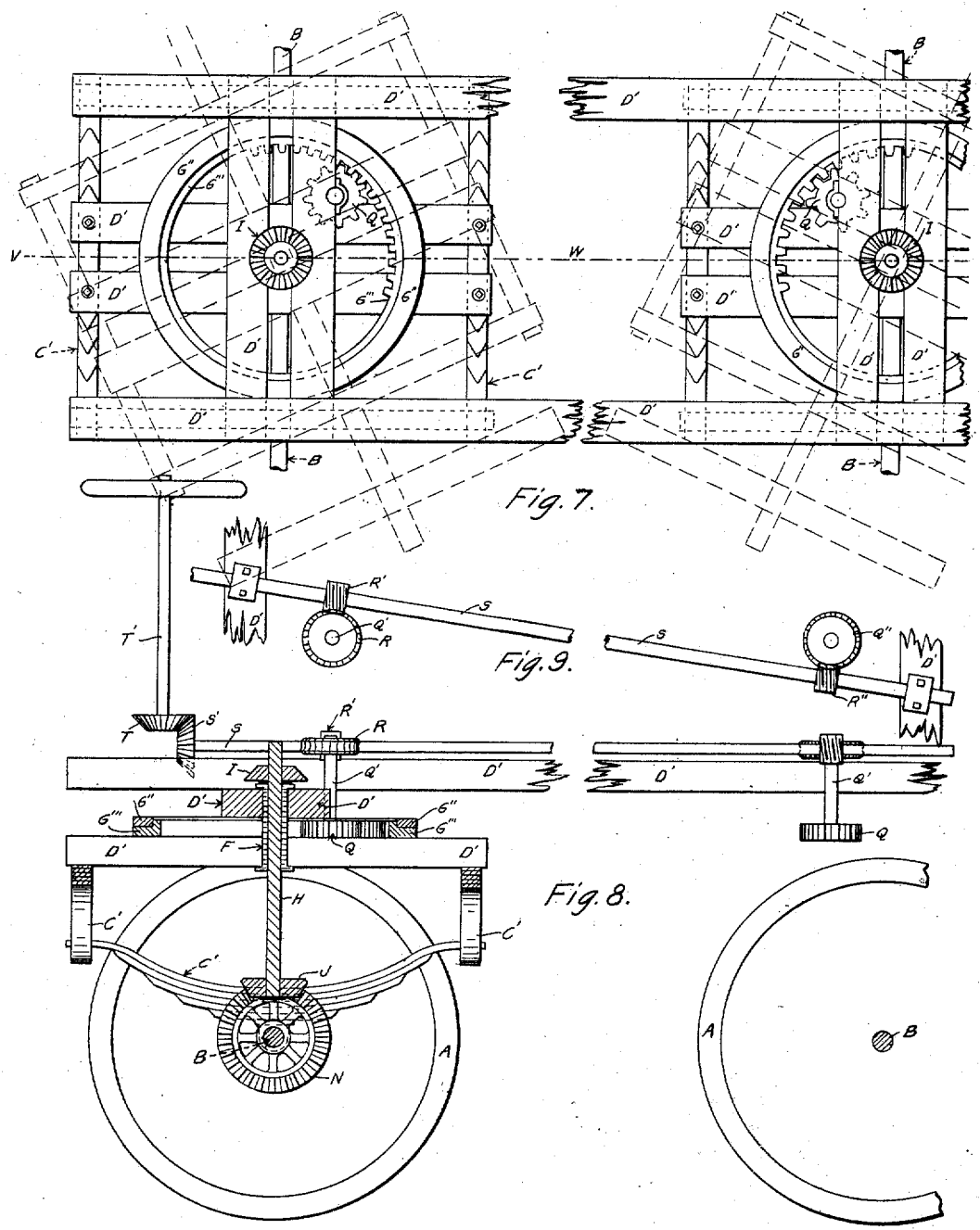

UNITED STATES PATENT OFFICE.

OSCAR A. GOODRICH, OF SIOUX CITY, IOWA.

TRACTION-VEHICLE.

SPECIFICATION forming part of Letters Patent No. 688,016, dated December 3, 1901.

Application filed May 28, 1901. Serial No. 62,297. (No model.)

*To all whom it may concern:*

Be it known that I, OSCAR A. GOODRICH, a citizen of the United States, residing at Sioux City, in the county of Woodbury and State of Iowa, (whose post-office address is Sioux City, Iowa,) have invented a new and useful Improvement in Traction-Gears; and I do declare the following to be a full, clear, and exact description of the same, reference being had to the accompanying drawings, forming a part thereof.

My invention relates to traction-gears for vehicles, and is especially adapted for automobiles or vehicles propelled by their own motive power, whether by steam, electricity, or gasolene.

The object of my invention is to produce a gear in which the power may be directly applied to the four wheels of the vehicle and which is adapted for use with any kind of springs, either side, end, or platform. This object I accomplish by the novel construction, arrangement, and combination of parts as shown in the accompanying drawings, forming a part thereof.

In the drawings, Figure 1 is a plan view of my invention, taken on the line below the body or box of the vehicle, showing the running-gear used with side springs. Fig. 2 is a sectional view taken on line X Y Z, Fig. 1. Fig. 3 is a plan view of my invention, showing the position of the running-gear when the vehicle is turned to make a corner. Fig. 4 is a detail view showing a longitudinal section of shaft and universal joint. Fig. 5 is a view in side elevation of steering apparatus. Fig. 6 is a detail view showing section of reach, also shaft, sprocket-wheel, and chain, used when gasolene-power is applied. Fig. 7 is a plan view of my invention as applied to a vehicle with platform-springs. Fig. 8 is a longitudinal sectional view taken on line V W, Fig. 7, showing in section one-half of Fig. 7 and also the steering apparatus. Fig. 9 is a plan view showing steering-shaft and worm-gears seen in Fig. 8. It will be noticed that with the exception of the steering apparatus the forward and rear parts of the gear are exactly alike.

Referring now to the illustrations, in which like parts are designated by similar letters of reference, A A designate the wheels of the vehicle, and B B the axles, the wheels being firmly secured to the axles, which turn in suitable bearings.

C C designate side springs secured at the axles to bearings *a a*, in which the axles turn. The opposite ends of the springs are firmly secured to the frame D D, which consists of two bolster-like parts of the shape indicated in Figs. 1 and 2 and connected by the reach E. The reach is pivotally secured at each end to the frame by means of the hollow shafts F F, which pass through the frame and the ends of the reach in the manner of a king-bolt and form the pivots on which the forward and rear parts of the gear turn.

G designates a segment of a cog-wheel made of iron or other suitable material, secured firmly to the front half of the frame, extending rearward, having cogs or teeth on both sides, the outer teeth adapted to enmesh with the teeth of the similar segment G', which is secured in the same manner to the rear half of the frame. These segments are adapted for steering the vehicle, as will be presently described.

H H designate shafts passing downward through the hollow shafts F F. Secured to the upper ends of these shafts are bevel-pinions I I, to which the power for driving the vehicle is applied. Secured to the lower ends of said shafts are bevel-pinions J J, adapted to enmesh with bevel-pinions K K, secured to the shafts L L, which are adapted for turning the axles.

M M designate bevel-pinions secured to the shafts L L, and N N designate larger bevel-wheels on the axles B B, enmeshing with the pinions M M.

O designates a universal joint in the shaft L, adapted to overcome the vertical motion of the frame caused by the springs.

P P designate supports for the shafts L L, pivotally secured to the frame and to the axles.

Q designates a small cogged wheel situated upon suitable bearing on the reach E and adapted to enmesh with the inside teeth of the segment G, and by its operation the vehicle is steered. A shaft Q' extends upward from said wheel and at the upper end has a worm-wheel R. Another worm-wheel R', secured to the shaft S, is adapted to enmesh with said wheel R. A bevel-pinion S' is secured to the other end of said shaft S and is adapted to enmesh with the bevel-pinion T, secured to the crank-handle T'. The shaft Q' extends upward into the box of the vehicle, and the other parts of the steering apparatus may be adjusted for the convenience of the driver, as indicated by the dotted lines in Fig. 2.

U designates a cover-plate for the running-gear and is adapted to support the engine or other motive power used in propelling the vehicle.

The device shown in Figs. 1, 2, 3, and 4 is adapted to be used with steam as the motive power. When, however, it is desired to use gasolene, the shaft H H and part of the shaft L are removed or disregarded and the device shown in Fig. 6 utilized. A shaft L' is adapted to operate in suitable bearings in the supports $b\,b$, extending downward from the reach. The shafts L L are disconnected at the universal joints and the outer ends of said shafts connected with said shaft L' at points directly below the hollow shafts F F. A sprocket-wheel $c$, secured to said shaft L', is connected by means of the chain $d$ to the engine, located in the box of the vehicle.

It will be seen that a vehicle with my improved gear can be turned in the smallest possible space, and to obviate too short a turn of the vehicle and to prevent accidents the triangular parts $e\,e$ are secured to the outside of the segments G and G' at the extremities of the portions having the teeth or are cast with said segments in solid pieces. The meeting of the segments at these triangular parts prevents the vehicle from turning farther, and the capacity of the vehicle for short turning can be regulated by the size of these parts.

In Figs. 7, 8, and 9 my invention is shown applied to platform-springs which are used with large trucks and for heavy hauling. D' designates the frame of the ordinary kind, and C' the usual form of platform-springs. The frame answers all purposes of a reach. The hollow shafts or king-bolts F F are situated directly over the axle, and the pinions J J at the lower ends of the shafts H H are inverted and enmesh directly with the wheels N N on the axles. Instead of the segments G and G' the wheels G''' G''' are used. These wheels are firmly secured to the frame below, and the hollow shafts F F form the axes of said wheels. They are adapted to turn under and within the rim-wheels G'' G'', firmly secured to the frame above. The axles being much farther apart in this form of vehicle, the wheels are separated and are provided with cogs only upon the inner parts of the rim, in the same manner as the segment G. The small cogged wheel Q is used to enmesh with the cogs of each of said wheels in the same manner as with the segment G, and said small cog-wheels are operated by two sets of worm-wheels R and R' and R'' and Q'' in connection with the shaft S. By the shaft S operating upon opposite sides of the worm-wheels R and Q'', as seen in Fig. 9, both trucks of the gear are guided by the driver by the use of the crank-handle T' in the same manner as heretofore shown.

When it is desired to use electric power in propelling the vehicle, the shafts H H are removed and the wires are passed through the hollow shafts F F and connected with the axles.

It will be seen that my invention provides for applying the power to both axles of the vehicle, so that the four wheels are propelled, thus saving a great waste of power and bringing the vehicle under perfect control.

Having described my invention, what I claim as new, and desire to secure by Letters Patent, is—

1. The combination with the trucks of a vehicle a frame for each pair of said trucks and a reach pivotally connecting said frames, of a hollow king-bolt passing through said frame and the end of said reach and forming the pivot on which said frame and reach turn, a shaft passing through said hollow king-bolt adapted for the application of power at one end and a bevel-gear connecting said shaft with the axle of the vehicle, substantially as described.

2. The combination, in a vehicle-gear, of a frame for each pair of trucks of said vehicle, a reach pivotally secured at each end to said frame, a hollow king-bolt passing through the frame of each of said trucks and through each end of said reach and forming the pivot on which said frame and reach turn, shafts passing through said hollow king-bolts adapted for the application of power, bevel-gears connecting said shafts with the axles of the vehicle, with a segment of a wheel having cogged teeth upon the inner side secured to the forward frame, a cogged wheel operating on the reach of said vehicle and enmeshing with said segment, and means for turning said cogged wheel and guiding said forward trucks, substantially as described.

3. The combination with a frame for each pair of trucks of a vehicle, a reach pivotally connecting said frames, a hollow king-bolt passing through the frame of each of said trucks and through each end of said reach, shafts passing through said hollow king-bolts adapted for the application of power, bevel-gears connecting said shafts with the axles of the vehicle and adapted for turning the same, of the segment of a cog-wheel secured to each frame of said trucks, said cogs adapted to enmesh with each other, one of said segments having cogs or teeth on both sides thereof, a cog-wheel operated on suitable bearings engaging with the inside teeth of said segment, and means for connecting said cog-wheel with an operating-handle, whereby the same may be turned and said trucks guided, substantially as described.

4. The combination with the trucks of a vehicle, a frame for each pair of said trucks, a reach pivotally connecting said frames, of a hollow king-bolt passing through said frame and the end of said reach, a vertical shaft passing through said hollow king-bolt adapted for the application of power, a bevel-pinion on said shaft, a horizontal shaft having a bevel-pinion at each end adapted to enmesh with the pinion of said vertical shaft and with a cog-wheel on the axle of the vehicle, and a universal joint in said horizontal shaft, substantially as described.

5. The combination with the trucks of a vehicle, a frame for each pair of said trucks and a reach pivotally connecting said frames, of a bolt passing vertically through said frame and the ends of said reach, and forming a pivot on which said frame and reach are adapted to turn, a segment of a cog-wheel secured to each of said trucks and adapted to enmesh with each other, one of said segments having teeth upon the inner side thereof, a cog-wheel operating on suitable bearings and adapted to enmesh with the inner teeth of said segment and operate the same, and means for turning said cog-wheel in either direction at the will of the operator, substantially as described.

6. The combination with the trucks of a vehicle, a frame for each pair of said trucks and a reach pivotally connecting said frames, of a bolt passing vertically through said frame and the ends of said reach, a segment of a cog-wheel secured to the frame of each pair of said trucks and adapted to enmesh with each other, one of said segments having teeth on the inner side thereof, a cog-wheel operating in suitable bearings and adapted to enmesh with the inner teeth of said segment, means for turning said cog-wheel in either direction at will of the driver, a horizontal shaft operating in suitable bearings attached to said reach, means connected with the motive power of said vehicle for turning said shaft, bevel-pinions connecting each end of said shaft with the axles of the vehicle, and universal joints in said shaft, substantially as described.

7. The combination with the trucks of a vehicle, a frame and springs for each pair of said trucks, a hollow king-bolt passing through the center of said frame and forming a pivot on which said frame is adapted to turn, a shaft passing through said king-bolt adapted for the application of power and a bevel-gear connecting said shaft with the axle of the vehicle, of a horizontal wheel secured to and adapted to turn with said frame, a cog-wheel operating on suitable bearings and enmeshing with said horizontal wheel, and means for connecting said cog-wheels on each frame and turning each pair of said trucks at the will of the driver, substantially as described.

In testimony whereof I affix my signature in the presence of two witnesses.

OSCAR A. GOODRICH.

Witnesses:
WESTON SMALL,
J. M. LEWIS.